United States Patent
Han et al.

(10) Patent No.: US 12,027,697 B2
(45) Date of Patent: Jul. 2, 2024

(54) ONE-BODY PARTICLE FOR CATHODE ACTIVE MATERIAL

(71) Applicant: L&F CO., LTD., Daegu (KR)

(72) Inventors: Hyun Gyu Han, Daegu (KR); Han Ah Kim, Daegu (KR); Gi Hwan Chang, Daegu (KR); Jeong A Gu, Daegu (KR); Sung Kyun Chang, Daegu (KR); Doe Hyoung Kim, Daegu (KR)

(73) Assignee: L&F CO., LTD., Daegu (KR)

( * ) Notice: Subject to any disclaimer, the term of this patent is extended or adjusted under 35 U.S.C. 154(b) by 0 days.

(21) Appl. No.: 17/764,626

(22) PCT Filed: Oct. 22, 2021

(86) PCT No.: PCT/KR2021/014913
§ 371 (c)(1),
(2) Date: May 5, 2022

(87) PCT Pub. No.: WO2022/092713
PCT Pub. Date: May 5, 2022

(65) Prior Publication Data
US 2024/0038973 A1    Feb. 1, 2024

(30) Foreign Application Priority Data
Nov. 2, 2020 (KR) .................... 10-2020-0144514

(51) Int. Cl.
| | | |
|---|---|---|
| *H01M 4/38* | (2006.01) | |
| *H01M 4/02* | (2006.01) | |
| *H01M 4/46* | (2006.01) | |
| *H01M 4/505* | (2010.01) | |
| *H01M 4/525* | (2010.01) | |
| *H01M 10/052* | (2010.01) | |

(52) U.S. Cl.
CPC ........... *H01M 4/382* (2013.01); *H01M 4/463* (2013.01); *H01M 4/505* (2013.01); *H01M 4/525* (2013.01); *H01M 10/052* (2013.01); *H01M 2004/028* (2013.01)

(58) Field of Classification Search
None
See application file for complete search history.

(56) References Cited

U.S. PATENT DOCUMENTS

| 8,722,250 B2* | 5/2014 | Park ...................... H01M 4/525 |
|---|---|---|
| | | 429/231.95 |
| 2009/0117465 A1* | 5/2009 | Tokunaga ............. H01M 4/622 |
| | | 429/223 |

FOREIGN PATENT DOCUMENTS

| JP | 11-067209 | * | 3/1999 |
|---|---|---|---|
| JP | 2007-258139 | * | 10/2007 |
| KR | 10-2003-0033912 A | * | 5/2003 |
| KR | 2016-0040116 | | 4/2016 |
| KR | 2016-0074236 | | 6/2016 |
| KR | 2018-0064295 | | 6/2018 |
| KR | 2019-0044327 | | 4/2019 |
| KR | 2020-0018852 | | 2/2020 |
| KR | 10-2020-0099425 | | 8/2020 |
| WO | 2019-120973 | | 6/2019 |

OTHER PUBLICATIONS

Machine translation of KR 10-2003-0033912A, published on May 1, 2003 (Year: 2003).*
Machine translation of KR10-2020-00099425, published on Aug. 24, 2020 (Year: 2020).*
Machine translation of JP 2007-258139A, published on Oct. 4, 2007 (Year: 2007).*
Machine translation of JP 11-067209, published on Mar. 9, 1999 (Year: 1999).*
Jang,B.-C., Son, J.-T.—Structural Characterization of New Composition Core-Shell Li((Ni0.88Co0.07Al0.05)x(Ni0.55Co0.2Mn0.2Al0.05)y)O2 Spherical Particles as a Cathode Material for Lithium-Ion Batteries, Journal of Nanoscience and Nanotechnology, vol. 16, 2016, pp. 10681-10688 (Year: 2016).*

* cited by examiner

*Primary Examiner* — Anca Eoff
(74) *Attorney, Agent, or Firm* — LEX IP MEISTER, PLLC

(57) ABSTRACT

Disclosed, as a particle for cathode active materials, is a novel one-body particle for cathode active materials, including a core of lithium transition metal oxide containing Ni and a surface-layer portion formed on at least a part of the core, wherein the surface-layer portion contains both Co and a structure-stabilizing element, the core is present as a non-aggregated primary particle, and the structure-stabilizing element has a bond dissociation energy (BDE) with oxygen (O) greater than a bond dissociation energy (BDE) of Co and oxygen (O).

15 Claims, 3 Drawing Sheets

[FIG. 1]
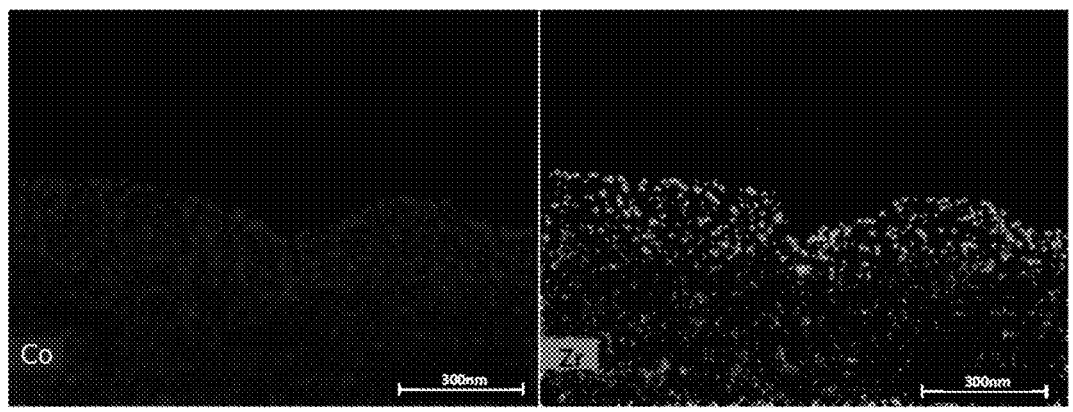
[FIG. 2A]
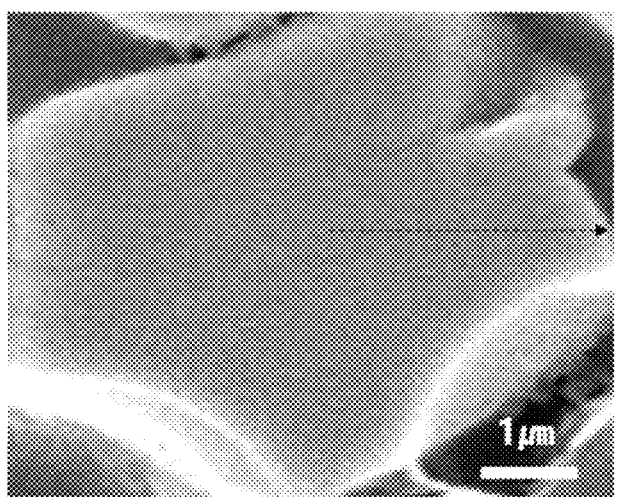

[FIG. 2B]
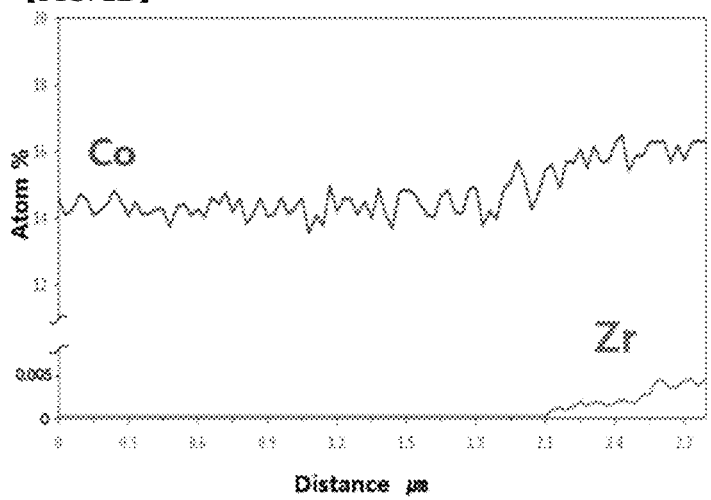
[FIG. 3]
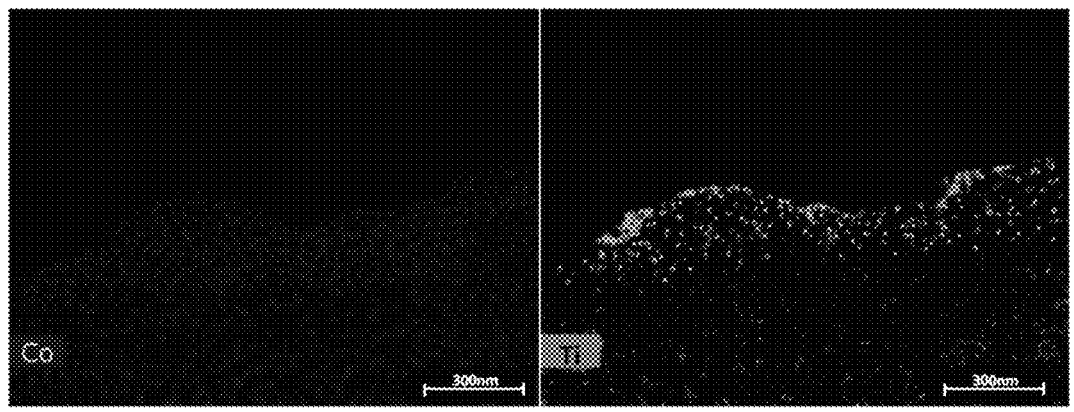
[FIG. 4A]
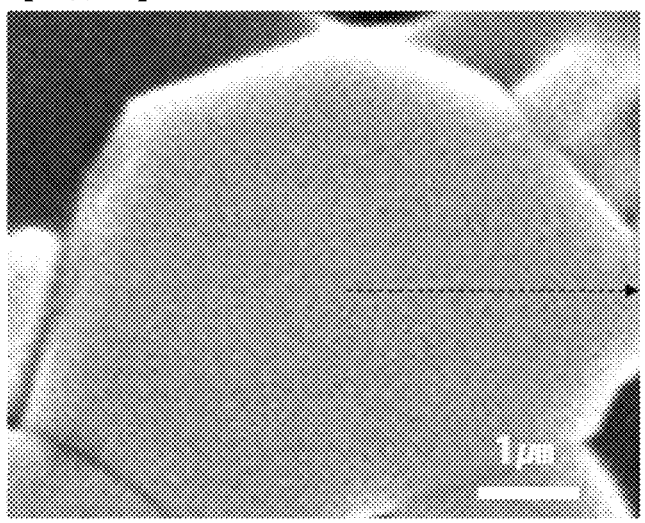

[FIG. 4B]
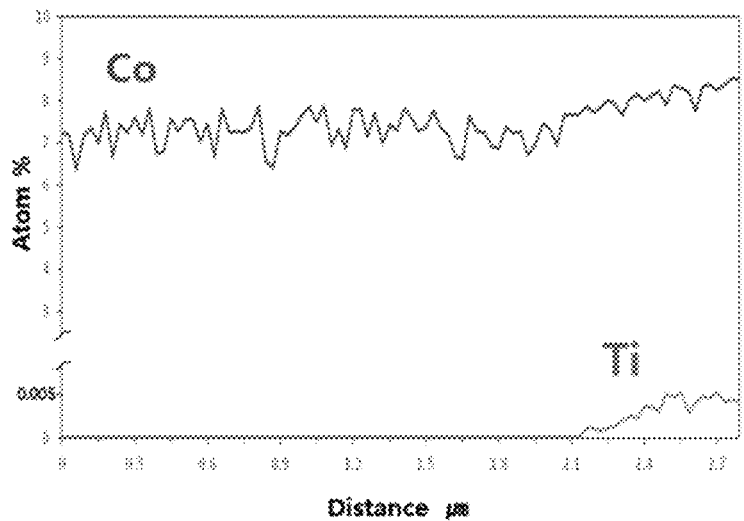
[FIG. 5]
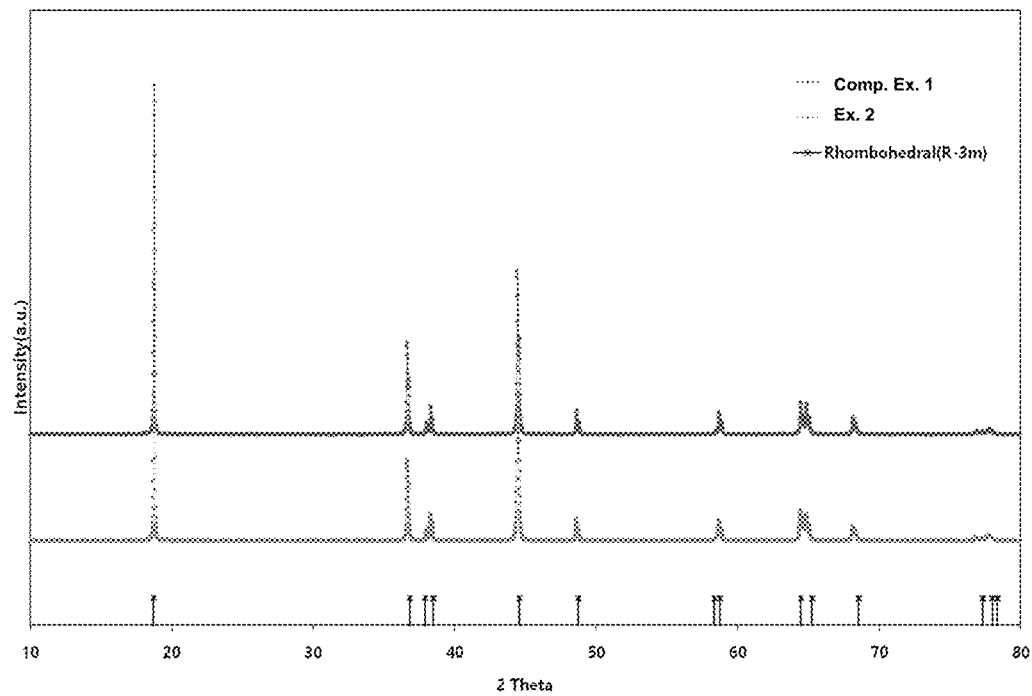

ONE-BODY PARTICLE FOR CATHODE ACTIVE MATERIAL

CROSS-REFERENCE TO RELATED APPLICATIONS

The instant application is a National Stage entry under 37 CFR 371 of the International Application No. PCT/KR2021/014913 filed on Oct. 22, 2021, which claims benefit to application No. 10-0144514 filed on Nov. 2, 2020 in the Republic of Korea.

TECHNICAL FIELD

The present invention relates to a novel one-body particle for cathode active materials, and more particularly to a novel one-body particle that contains a core in the form of a non-aggregated primary particle and Co and a structure-stabilizing element present on the surface layer of the core, and thus is capable of solving the problems of the conventional secondary particle structure, thereby alleviating oxygen desorption, improving capacity/efficiency/lifespan characteristics, and reducing resistance thereof.

BACKGROUND ART

Lithium secondary batteries are used in various fields such as those of mobile devices, energy storage systems, and electric vehicles due to the high energy density and voltage, long cycle life, and low self-discharge rate thereof.

The cathode active material used in such a lithium secondary battery generally has a structure of secondary particle having a size of several μm in which fine primary particles having a sub-micron size are aggregated. The cathode active material having such a secondary particle structure has a problem in that the secondary particle is broken as the aggregated primary particles are separated during repeated charging and discharging, causing deterioration in battery characteristics. Since this problem is due to the structural characteristics of the secondary particle, it is difficult to solve the problem without changing the structure thereof. Therefore, a one-body particle having a new structure has been developed.

This one-body particle has a "non-aggregated single particle structure" rather than a conventional "aggregate structure of primary-particles" and undergoes no particle separation during charging and discharging, and thus solves problems occurring in secondary particle active materials because there is almost no particle aggregation. Here, the expression "there is almost no particle aggregation" allows for a small amount of aggregate that is unavoidably present during the preparation of new one-body particles/powders. That is, it is impossible for all particles to be completely separated from one another due to technical limitations, so some aggregate may be unintentionally formed.

Unlike conventional secondary particles, the novel one-body particle has a size of several μm and does not have an aggregate structure, so there is no particle separation during charging and discharging, and problems occurring in secondary particle active materials can be fundamentally solved.

However, the secondary particle active material has been commercialized for a long time and has been applied to various industrial fields, but the one-body particle active material is used only for research purposes because it is very difficult to secure stabilized characteristics of the one-body particle active material. This is due to structural differences therebetween. As described above, the reason for this is that problems of the secondary particle active material that are difficult to solve can be easily avoided by using the one-body particle, whereas problems that do not need to be considered in the secondary particle active material are critical in the one-body particle, and it is very difficult to solve the problems. The present applicant developed the present invention in view of the problems caused by such structural differences.

Oxygen desorption is a representative example of the problems appearing in one-body particles. The degree of oxygen desorption increases in proportion to the calcination temperature and the Ni content, and when the calcination temperature is low, the degree of oxygen desorption is very low, even when the Ni content is high.

In general, high-Ni (60 mol % or more of Ni) active materials in the form of secondary particles undergo very little oxygen desorption because the calcination temperature is as low as 700 to 800° C. during production. In particular, as the Ni content increases, the calcination temperature is decreased to about 700° C., and there is almost no oxygen desorption. For this reason, various studies are being conducted on secondary particle active materials to further improve capacity/output/efficiency, etc. rather than oxygen desorption.

Meanwhile, one-body particles have a high calcination temperature of about 850 to 1,000° C., thus increasing oxygen desorption. It is impossible to produce a one-body particle structure at a low calcination temperature, so it is difficult to greatly lower the calcination temperature even when the Ni content is increased, and thus there is a problem in that it is difficult to reduce the oxygen desorption phenomenon. Oxygen desorption occurs on the surface of one-body particles.

As such, if the problem of oxygen desorption of one-body particles requiring a high calcination temperature is not solved, it becomes more difficult to produce a high-Ni cathode active material.

For example, when the Ni content of the one-body particles is less than 60%, the degree of oxygen desorption is not severe, but when the Ni content thereof is 60% or more, the degree of oxygen desorption increases, and particularly, when the Ni content thereof is 80% or more, it becomes very severe. It is very difficult to solve this problem due to the high calcination temperature.

Oxygen desorption causes production, in an excessive amount, of NiO, which is a rock salt structure, in the layered structure of the cathode active material, and increased Li byproducts. NiO gradually increases due to repeated charging and discharging, thus causing increased resistance and an increased amount of Li byproducts and thus various side reactions, which results in deterioration of battery performance such as capacity reduction. As such, it is necessary to solve the problem of oxygen desorption in order to commercialize a one-body active material.

In addition to oxygen desorption, structural stability of one-body particles is an important factor determining the lifespan. Mn, which functions to improve structural stability, is contained therein along with Ni. However, when the Ni content increases, the relative Mn content decreases, thus causing problems of deteriorated structural stability and lifespan. That is, in order to produce high-Ni one-body particles having excellent properties, the problems of oxygen desorption and lifespan reduction must both be solved.

Specifically, Japanese Patent Laid-Open Publication No. 2003-068300, which pertains to a representative prior art related to one-body particles, discloses a one-body particle having an average particle diameter ranging from 0.2 μm or more to 5 μm or less and a solution to the structural problems of secondary particle active material as described above. Also, this patent discloses a lithium nickel-manganese composite oxide represented by $LiNi_{0.5}Mn_{0.5}O_2$ as an example of the one-body particle. However, the patent gives no consideration to the problem of oxygen desorption due to a high calcination temperature or to the problem of severe oxygen desorption when the Ni content is high, such as 60% or more.

In addition, Korean Patent No. 10-1971442, which pertains to a representative prior art related to a secondary particle active material, discloses secondary particles in which sub-micron-sized primary particles are aggregated, wherein the concentration of cobalt at the grain boundary between the primary particles is higher than the concentration of cobalt inside the primary particles. However, the patent also discloses a secondary particle structure and thus cannot solve the above-described structural problem, and does not consider the problem of oxygen desorption generated in one-body particles. In particular, the characteristic whereby a high concentration of cobalt is located at the grain boundary formed between the primary particles does not appear in structurally completely different one-body particles, and thus does not solve the problem resulting from the structural characteristics of the one-body particles described above.

As such, the inherent problems caused by the structural characteristics of one-body particles do not occur in the secondary particle structure, so an approach from a new perspective is needed to fundamentally solve the same.

DISCLOSURE

Technical Problem

Therefore, the present invention has been made to solve the above and other technical problems that have yet to be solved.

Therefore, as a result of extensive research and various experimentation, the present inventors solved problems such as increased resistance and decreased capacity due to NiO, which is a rock salt structure that is stoichiometrically generated by oxygen desorption during the production of one-body particles and that, at the same time, solved the problem of deterioration in lifespan that occurs when the Mn content decreases due to the increase in the Ni content.

As described above, the secondary particle structure of the conventional cathode active material is in the form of densely aggregated primary particles, so there is an interface between closely adhered primary particles, whereas novel one-body particles for the cathode active material of the present invention are present as non-aggregated primary particles, and thus do not exhibit the above-mentioned structural characteristics and avoid the problem of separation between the aggregated primary particles.

In particular, as a result of extensive research to reduce oxygen desorption that occurs during calcination of novel one-body particles having a high Ni content and to mitigate the lifespan reduction, the present inventors found that, when a surface-layer portion containing Co and the structure-stabilizing element is formed on the core, the oxygen desorption phenomenon was alleviated, thus leading to improved capacity/efficiency/lifespan characteristics, and reduced resistance. Based on this finding, the present invention was completed.

Technical Solution

In accordance with an aspect of the present invention, provided is a novel one-body particle for cathode active materials, including:
a core of lithium transition metal oxide containing Ni, and a surface-layer portion formed on at least a part of the core,
wherein the surface-layer portion contains both Co and a structure-stabilizing element,
the core is present as a non-aggregated primary particle, and
the structure-stabilizing element has a bond dissociation energy (BDE) with oxygen (O) greater than a bond dissociation energy (BDE) of Co and oxygen (O).

As defined above, the novel one-body particle according to the present invention includes a core present as a non-aggregated primary particle and a surface-layer portion disposed on the surface of the core, wherein the surface-layer portion contains Co and a structure-stabilizing element.

In a specific example, the content of Ni in the core of the novel one-body particles of the present invention may be 60 mol % or more, which may cause severe oxygen desorption during the calcination process, and in particular, preferably 80% or more, which may cause very severe oxygen desorption.

In general, Ni-based one-body particles that contain Ni as a main component among transition metals contain Mn to thereby improve lifespan characteristics. However, when the Ni content increases, the maximum possible content of Mn is relatively reduced, thus reducing structural stability and deteriorating the lifespan.

According to the present invention, when Co is contained in the surface-layer portion of the one-body particles, oxygen desorption is alleviated, and the capacity, efficiency and lifespan are improved by the action of Co contained in the surface-layer portion. However, using only the surface layer containing Co, it is impossible to solve the problem of deterioration in lifespan due to a decrease in the Mn content. That is, Mn, which is homogeneously distributed in the entire volume of the novel one-body particle prepared through primary calcination, remarkably improves lifespan characteristics compared to Co in the surface-layer portion formed through secondary calcination, so even if a surface layer portion containing Co is formed when the Mn content decreases, the lifespan characteristics are deteriorated.

In consideration thereof, the present inventors reviewed additional methods of further improving the lifespan despite the inclusion of Co in various technical aspects. Factors that decrease the lifespan of a secondary battery are combined factors rather than a specific factor, and a representative factor is the deformation/collapse of the crystal structure due to charging and discharging. When the secondary battery is charged and discharged, the crystal structure contracts/expands, and the distance between the O (oxygen) layers that are separated from one another repeatedly increases and decreases. As this process is repeated, the crystal structure is deformed/collapsed, and the lifespan characteristics are deteriorated. This means that the deformation/collapse of the crystal structure can be suppressed if the distance between the O (oxygen) layers is maintained during charging and discharging. The present applicant predicted that the above-mentioned problems can be solved if these factors are improved.

In order to derive a method of suppressing the deformation/collapse of the crystal structure, it is necessary to first understand the difference between "bond dissociation energy (BDE)" and "bond energy". The term "bond dissociation energy (BDE)" is equal to the bond energy of a diatomic molecule, and means the energy of a single chemical bond. In contrast, the term "bond energy" refers to the average value of the "bond dissociation energy" of all bonds of a specific type in a molecule. The bond dissociation energy (BDE) with oxygen of each material is widely known through known literature such as 'Lange's Handbook of Chemistry', and thus a description thereof will be omitted herein.

Based thereon, the present inventors predicted that, if a material that can bind with strong energy ("structure-stabilizing element") to maintain the distance between O (oxygen) layers during charging and discharging is used in combination with Co, deformation/collapse of the crystal structure can be suppressed, and reviewed the criteria for selecting suitable substances therefor.

According to 'Lange's Handbook of chemistry', the bond dissociation energy (BDE) of Co and O (oxygen) applied to the surface layer is 368 kJ/mol. It was found that merely applying Co to the surface layer was insufficient to prevent the distance between O (oxygen) layers from changing during charging and discharging. This finding led to the conclusion that when a material (structure-stabilizing element) that can bond to O (oxygen) with a stronger force than Co is used in combination with Co, the oxygen desorption phenomenon can be alleviated, and at the same time, the collapse of the crystal structure can be further suppressed and the lifetime can be greatly improved. The experimental results for this are shown in Table 1, to be described later.

Therefore, as used herein, the term "structure stabilization element" means an element having a BDE greater than the bond dissociation energy (BDE) of Co and O, among elements that may constitute the cathode active material, the types of these elements and the bond dissociation energy thereof with O (oxygen) are as follows, and one element, or two or more elements and/or compounds, may be applied:

Zr (760 kJ/mol), Ti (662 kJ/mol), Al (512 kJ/mol), P (596.6 kJ/mol), Si (798 kJ/mol), B (806 kJ/mol), W (653 kJ/mol), Mg (394 kJ/mol), Sn (548 kJ/mol).

Accordingly, in one specific example, the structure-stabilizing element in the present invention may include one or more elements selected from the group consisting of Zr, Ti, Al, P, Si, B, W, Mg, and Sn.

The experimental results in Table 1 show that the lifespan characteristics vary depending on the Mn content, and when the surface-layer portion containing Co is formed through secondary calcination, the resistance and residual lithium are reduced and the lifespan is somewhat improved. In addition, it can be seen that when the structure-stabilizing element is used in combination with Co, the lifespan is remarkably improved compared to when Co is used alone.

The calcination temperature of Co is relatively high, so the calcination may be performed on each type of structure-stabilizing element.

As can be seen from the above, according to the present invention, Co is used to supply desorbed oxygen and at the same time to reduce residual lithium, thereby improving the layer structure recovery and capacity/efficiency/lifespan of the novel one-body particles and reducing the resistance thereof, and an element with a strong bond dissociation energy (BDE) with oxygen is used therewith to form a surface-layer portion so as to suppress the movement of the O (oxygen) layer during charging and discharging, suppress deformation/collapse of the crystal structure, and further prolong the lifespan.

As defined above, in the novel one-body particle of the present invention, the core is present as a non-aggregated primary particle.

In one specific example, the non-aggregated primary particle may have an average particle diameter (D50) of 1 μm to 10 μm so as to exhibit appropriate properties for a cathode active material. The cathode active material is present as non-aggregated primary particles having the particle size as described above, thus solving the problems of the conventional secondary particle structure in which the secondary particles are broken and cleaved into primary particles during repeated charging and discharging, thus causing deteriorated battery characteristics.

In another specific example, the surface-layer portion may be formed outside the outermost surface of the core, depending on the production method thereof, or may penetrate to a certain depth inside the surface of the core, so as to define a part of the surface of the core as a surface-layer portion having a certain thickness. The former provides a structure in which the surface-layer portion is formed in an outward direction from the surface of the core, whereas the latter provides a structure in which the surface-layer portion is formed in an inward direction from the surface of the core. That is, elements may be combined from outside the core surface to form a surface-layer portion having a composition different from that of the core, or elements diffuse inwards from the core surface to form a surface-layer portion in which a part of the core surface has a composition different from that of the core. Both may be formed in combination.

In general, a process of producing an active material as an oxide by calcination of a mixture of a transition metal precursor with a Li raw material is referred to as "primary calcination", and a process of calcination of the active material that has undergone primary calcination once more at a relatively low temperature is referred to as "secondary calcination". Although the embodiments described later are described based on the formation of the surface-layer portion through secondary calcination, a variety of production methods may be used to form the surface-layer portion, as long as the same effect can be realized. For example, the surface-layer portion may be formed separately using secondary calcination and tertiary calcination.

Co may have different positions and structures depending on the calcination temperature. For example, when calcination is performed at a low temperature of 500° C. to 700° C., Co does not penetrate into the core, but reacts with Li on the surface to form the LCO ($LiCoO_2$) surface layer having a spinel structure. When Co does not enter the core but forms the surface-layer portion from the outside, the effect of alleviating oxygen desorption is relatively reduced, but the effect of reducing resistance increases due to the greatly reduced amount of residual Li.

Meanwhile, when calcined at a high temperature of 700° C. to 800° C., Co diffuses from the surface of the core to the inside to a certain depth to form a surface-layer portion having a predetermined thickness. Co has the ability to carry a large amount of oxygen (O) when it enters the core, so Co is supplied into the core along with oxygen.

As described above, as the Ni content increases, oxygen desorption on the surface also increases rapidly. However, in the novel one-body particle according to the present invention, when Co diffuses into the core, it carries oxygen from outside into the core to induce recombination of Li and oxygen, so oxygen desorption on the surface is alleviated. That is, the crystal structure destabilized due to oxygen desorption reacts again with oxygen introduced therein to restore a uniform layered structure, and thus the capacity/efficiency/lifespan characteristics are improved and the resistance is reduced.

It is known that the battery characteristics of a layered structure are better than those of a spinel structure, and in terms of alleviating oxygen desorption, at a low calcination temperature, most Co reacts outside the core, and the amount of oxygen supplied to the inside may be reduced, so a better effect of alleviating oxygen desorption can be obtained when forming the surface-layer portion in an inward direction from the surface of the core. Of course, formation of the surface-layer portion of the spinel structure on the surface of the core does not mean that oxygen is not supplied to the inside, and some of the oxygen supplied to the surface of the core along with Co penetrates into the inside, resulting in an effect of alleviating oxygen desorption. However, in this case, the amount of oxygen penetrating into the core may be relatively reduced.

Therefore, it may be more preferable to form a layered structure of Co in the surface-layer portion.

Calcination for the formation of the surface-layer portion may be performed by mixing a Co precursor and a structure-stabilizing element precursor with the core prepared in the primary calcination, followed by calcination. Examples of the Co precursor may include hydroxide, oxide, and various salts of Co, such as $Co(OH)_3$, and examples of the structure-stabilizing element precursor include oxides, various salts, and hydroxides of the structure-stabilizing element, such as $ZrO_2$, $TiO_2$, $Al_2O_3$, and $(NH_4)_3PO_4$, but the structure-stabilizing element precursor is not limited thereto.

The temperature for this calcination may be, for example, in the range of 500° C. to 800° C., preferably in the range of 700° C. to 800° C.

In addition, oxygen desorption mainly occurs in the surface portion corresponding to about 10% of the depth from the center of the core to the surface thereof. Therefore, it is preferable that the thickness of the surface-layer portion be within 10% of the average particle diameter of the core such that the area in which oxygen desorption occurs is mainly included in the surface-layer portion.

In one specific example, in the present invention, the core, which is a lithium transition metal oxide containing Ni, may have the following Formula 1, and the surface-layer portion may include at least one of the following Formula 2 and Formula 3.

[Formula 1]

$Li_aNi_bCo_cMn_dD_eO_x$ (1)

wherein a, b, c, d, e and x satisfy 0.95≤a≤1.1, 0.6≤b≤1, 0≤c≤0.4, 0≤d≤0.4, 0≤e≤0.05 and 0≤x≤4, respectively, and
    D includes at least one of Ti, Zr, Al, P, Si, B, W, Mg, and Sn.

[Formula 2]

$Li_jNi_gCo_hMn_iM_jO_k$ (2)

wherein f, g, h, 1, j and k satisfy 0.95≤f≤1.1, 0.6≤g≤1, 0<h≤0.45, 0≤i≤0.4, 0<j≤0.2 and 0<k≤4, respectively, and
    M includes at least one of Ti, Zr, Al, P, Si, B, W, Mg, and Sn.

[Formula 3]

$Li_lCo_mM_nO_p$ (3)

wherein l, m, n and p satisfy 0.9≤l≤1.1, 0.9≤m≤1, 0<n≤0.1, and 0<p≤4, respectively, and M includes at least one of Ti, Zr, Al, P, Si, B, W, Mg, and Sn.

In the above formulas, the material when the surface-layer portion is mainly formed inside the core may have the composition of Formula 2, and the material when the surface-layer portion is mainly formed outside the core may have the composition of Formula 3.

As can be seen from the above formulas, there may be cases in which the same element as the structure-stabilizing element among the element(s) constituting the core is included. In this case, at least one of Co and the structure-stabilizing element may have a higher content in the surface-layer portion than in the core, and preferably, both Co and the structure-stabilizing element may have a higher content in the surface-layer portion than in the core.

In terms of more effectively alleviating oxygen desorption and improving lifespan characteristics, it may be more preferable for the content of at least one of Co and the structure-stabilizing element in the surface layer to be at least 10% higher than the content (mol %) of the same element in the core.

The present invention also provides a lithium secondary battery including the electrode active material. The configuration and production method of the lithium secondary battery are known in the art, and thus a detailed description thereof will be omitted herein.

Effects of the Invention

As described above, the novel one-body particle according to the present invention has effects of solving the problem of the conventional secondary particle structure in the cathode active material having a high Ni content, alleviating oxygen desorption that occurs during calcination of the one-body particle, improving capacity/efficiency/lifespan characteristics, and reducing resistance.

DESCRIPTION OF THE DRAWINGS

FIG. 1 is a SEM EDS image showing the distribution of Co and Zr in the cathode active material prepared in Example 1;

FIG. 2A is a scanning electron microscope image showing the particles of the cathode active material prepared in Example 1, and FIG. 2B is a graph showing the content of Co and Zr in the portion indicated by the arrow in the particle of FIG. 2A;

FIG. 3 is a SEM EDS image showing the distribution of Co and Ti in the cathode active material prepared in Example 2;

FIG. 4A is a scanning electron microscope image showing the particles of the cathode active material prepared in Example 2, and FIG. 4B is a graph showing the content of Co and Ti in the portion indicated by the arrow in the particles of FIG. 4A; and FIG. 5 is a graph showing XRD patterns of the cathode active materials prepared in Example 2 and Comparative Example 1.

BEST MODE

Now, the present invention will be described in more detail with reference to the following examples. These examples should not be construed as limiting the scope of the present invention.

Example 1—$Ni_{0.75}Co_{0.15}Mn_{0.1}$ Novel One-Body Active Material+Co/Zr, 750° C. Secondary Calcination $NiSO_4$ as a nickel precursor, $CoSO_4$ as a cobalt precursor, and $MnSO_4$ as a manganese precursor were added to water at a molar ratio of 0.75:0.15:0.1 to prepare an aqueous solution of a nickel-cobalt-manganese hydroxide precursor. An aqueous solution of sodium hydroxide was slowly added dropwise while stirring the aqueous solution for 5 hours to neutralize the aqueous precursor solution to thereby precipitate $Ni_{0.75}Co_{0.15}Mn_{0.1}(OH)_2$ as nickel-cobalt-manganese hydroxide.

The precursor (nickel-cobalt-manganese hydroxide) thus obtained was mixed with LiOH, followed by primary calcination at 910° C. for 6 hours to prepare $LiNi_{0.75}Co_{0.15}Mn_{0.1}O_2$.

$Co(OH)_3$ including 1.5 mol of Co and $ZrO_2$ including 0.05 mol of Zr were mixed with the cathode active material prepared above, followed by secondary calcination at 750° C. for 7 hours to prepare a cathode active material having a surface-layer portion.

As shown in Table 1 below, a novel one-body material having a Ni content of 75 mol % has very low residual lithium, so the effect of reducing residual lithium using Co is not great.

In addition, the distribution of Co and Zr in the cathode active material prepared above was analyzed using SEM EDS, and the results are shown in FIG. 1. The content of the region indicated by arrows in the particles in the scanning electron microscope image of FIG. 2A was measured by line-mapping, and is shown in the graph of FIG. 2B.

As can be seen from these drawings, Co was present outwards from the surface of the core, and most of it diffused to a depth of 300 nm or less from the surface of the core to form a surface-layer portion, and the Co content in the surface-layer portion was higher than that in the core. It can be seen that most Zr was distributed in the surface-layer portion, because, unlike Co, it was not used as an elemental source during production of the core.

For reference, the present inventors found through additional experimentation that the depth of the surface-layer portion varied depending on the core particle size. For example, for a core having an average particle diameter of 5 μm, a surface-layer portion was formed to a depth of 300 nm, and for a core having an average particle diameter of 3 μm, a surface-layer portion was formed to a depth of 200 nm.

Example 2—$Ni_{0.83}Co_{0.09}Mn_{0.08}$ Novel One-Body Active Material+Co/Ti, 750° C. Secondary Calcination $NiSO_4$ as a nickel precursor, $CoSO_4$ as a cobalt precursor, and $MnSO_4$ as a manganese precursor were added to water at a molar ratio of 0.83:0.09:0.08 to prepare an aqueous solution of a nickel-cobalt-manganese hydroxide precursor. An aqueous solution of sodium hydroxide was slowly added dropwise while stirring the aqueous solution for 5 hours to neutralize the aqueous precursor solution to thereby precipitate $Ni_{0.83}Co_{0.09}Mn_{0.08}(OH)_2$ as nickel-cobalt-manganese hydroxide.

The precursor (nickel-cobalt-manganese hydroxide) thus obtained was mixed with LiOH, followed by primary calcination at 910° C. for 6 hours to prepare $LiNi_{0.83}Co_{0.09}Mn_{0.08}O_2$.

$Co(OH)_3$ including 1.5 mol of Co and $TiO_2$ including 0.05 mol of Ti were mixed with the cathode active material prepared as described above, followed by secondary calcination at 750° C. for 7 hours to prepare a cathode active material having a surface-layer portion.

As in Example 1, the distribution of Co and Ti in the cathode active material prepared above was analyzed using SEM EDS, and the results are shown in FIG. 3. The content of the region indicated by arrows in the particles in the scanning electron microscope image of FIG. 4A was measured by line-mapping, and is shown in the graph of FIG. 4B.

As can be seen from these drawings, the measurement results are similar to those in Example 1.

Example 3—$Ni_{0.83}Co_{0.09}Mn_{0.08}$ Novel One-Body Active Material+Co/Al, 750° C. Secondary Calcination $Co(OH)_3$ including 1.5 mol of Co and $Al_2O_3$ including 0.05 mol of Al were mixed with the cathode active material of Example 2 that had undergone primary calcination, followed by secondary calcination at 750° C. for 7 hours to prepare a cathode active material having a surface-layer portion.

Example 4—$Ni_{0.83}Co_{0.09}Mn_{0.08}$ Novel One-Body Active Material+Co/P, 750° C. Secondary Calcination $Co(OH)_3$ including 1.5 mol of Co and $(NH_4)_3PO_4$ including 0.05 mol of P were mixed with the cathode active material of Example 2 that had undergone primary calcination, followed by secondary calcination at 750° C. for 7 hours to prepare a cathode active material having a surface-layer portion.

Comparative Example 1—$Ni_{0.83}Co_{0.09}Mn_{0.08}$ Novel One-Body Active Material+750° C. Secondary Calcination Without Surface-Layer Portion $NiSO_4$ as a nickel precursor, $CoSO_4$ as a cobalt precursor, and $MnSO_4$ as a manganese precursor were added to water at a molar ratio of 0.83:0.09:0.08 to prepare an aqueous solution of a nickel-cobalt-manganese hydroxide precursor. An aqueous solution of sodium hydroxide was slowly added dropwise while stirring the aqueous solution for 5 hours to neutralize the aqueous precursor solution to thereby precipitate $Ni_{0.83}Co_{0.09}Mn_{0.08}(OH)_2$ as nickel-cobalt-manganese hydroxide.

The precursor (nickel-cobalt-manganese hydroxide) thus obtained was mixed with LiOH, followed by primary calcination at 910° C. for 6 hours to prepare $LiNi_{0.83}Co_{0.09}Mn_{0.08}O_2$.

Then, secondary calcination was performed at 750° C. for 7 hours to prepare a cathode active material.

Comparative Example 2—$Ni_{0.83}Co_{0.17}$ One-Body Active Material+750° C. Secondary Calcination without Surface Layer Portion $NiSO_4$ as a nickel precursor and $CoSO_4$ as a cobalt precursor were added to water at a molar ratio of 0.83:017 to prepare an aqueous solution of a nickel-cobalt-hydroxide precursor. An aqueous solution of sodium hydroxide was slowly added dropwise thereto while stirring the aqueous solution for 5 hours to neutralize the aqueous precursor solution to thereby precipitate $Ni_{0.83}Co_{0.17}(OH)_2$ as nickel-cobalt hydroxide.

The precursor (nickel-cobalt hydroxide) thus obtained was mixed with LiOH, followed by primary calcination at 910° C. for 6 hours to prepare $LiNi_{0.83}Co_{0.17}O_2$.

Then, secondary calcination was performed at 750° C. for 7 hours to prepare a cathode active material.

Comparative Example 3—$Ni_{0.83}Co_{0.09}Mn_{0.08}$ Novel One-Body Active Material+Co Alone, 750° C. Secondary Calcination $Co(OH)_3$ including 1.5 mol of Co was mixed with the cathode active material of Example 2, which had undergone primary calcination, followed by secondary calcination at 750° C. for 7 hours to prepare a cathode active material having a surface-layer portion.

Comparative Example 4—$Ni_{0.83}Co_{0.09}Mn_{0.08}$ Novel One-Body Active Material+Co Alone, 700° C. Secondary Calcination $Co(OH)_3$ including 1.5 mol of Co was mixed with the cathode active material of Example 2, which had undergone primary calcination, followed by secondary calcination at 750° C. for 7 hours to prepare a cathode active material having a surface-layer portion.

Comparative Example 5—$Ni_{0.83}Co_{0.17}$ Novel One-Body Active Material+Co Alone, 750° C. Secondary Calcination $NiSO_4$ as a nickel precursor and $CoSO_4$ as a cobalt precursor were added to water at a molar ratio of 0.83:017 to prepare an aqueous solution of a nickel-cobalt-hydroxide precursor. An aqueous solution of sodium hydroxide was slowly added dropwise while stirring the aqueous solution for 5 hours to neutralize the aqueous precursor solution to thereby precipitate $Ni_{0.83}Co_{0.17}(OH)_2$ as nickel-cobalt hydroxide.

The precursor (nickel-cobalt hydroxide) thus obtained was mixed with LiOH, followed by primary calcination at 910° C. for 6 hours to prepare $LiNi_{0.83}Co_{0.17}O_2$.

$Co(OH)_3$ including 1.5 mol of Co was mixed with the cathode active material prepared above, followed by secondary calcination at 750° C. for 7 hours to prepare a cathode active material having a surface-layer portion.

Example 5—$Ni_{0.83}Co_{0.17}$ Novel One-Body Active Material+Co/Ti, 750° C. Secondary Calcination $Co(OH)_3$ including 1.5 mol of Co and $TiO_2$ including 0.05 mol of Ti were mixed with the cathode active material of Comparative Example 5 that had undergone primary calcination, followed by secondary calcination at 750° C. for 7 hours to prepare a cathode active material having a surface-layer portion.

Experimental Example 1—Measurement of Resistance

The cation active material synthesized in each of Examples 1 to 5 and Comparative Examples 1 to 5, Super-P as a conductive material, and PVdF as a binder were mixed at a weight ratio of 95:2:3 in the presence of N-methylpyrrolidone as a solvent to prepare a cathode active material slurry. The cathode active material slurry was applied onto an aluminum current collector, dried at 120° C., and then rolled to produce a cathode.

A porous polyethylene film as a separator was interposed between the cathode produced as described above and an anode as a Li metal to produce an electrode assembly, the electrode assembly was placed in a battery case, and an electrolyte was injected into the battery case to produce a lithium secondary battery. The electrolyte used herein was prepared by dissolving 1.0M lithium hexafluorophosphate ($LiPF_6$) in an organic solvent consisting of ethylene carbonate/dimethyl carbonate (mixed at a volume ratio of EC/DMC=1/1).

Each of the lithium secondary batteries thus produced was subjected to charge (at 0.1 C, 4.3V) and discharge (at 0.1 C, 3.0V). The applied current was divided by a voltage change for 0 to 65 seconds from the start of the discharge to calculate a resistance (V/I=R). The results are shown in Table 1 below.

Experimental Example 2—Measurement of Residual Lithium

Residual lithium was measured under the following conditions in the cathode active materials prepared in Examples 1 to 5 and Comparative Examples 1 to 5, and the results are shown in Table 1 below.

① Sample Pretreatment

5±0.01 g of sample and 100 g of distilled water were added to a conical beaker containing a magnetic bar, followed by stirring for 5 minutes.

The stirred sample was naturally filtered through filter paper.

The filtrate was titrated in a beaker.

② Test Method

A titrator was charged with a titrant (0.1N HCl), and then bubbles were removed from the cylinder.

Titrant: 0.1N HCl

Titrant aliquot method: DET

Condition for automatic completion of titration: pH 2.5

Calculation: FP(1)=4.5, EP(1)

titration rate: Greatest.

Experimental Example 3—Measurement of Resistance

As can be seen from Experimental Example 1, a lithium secondary battery was prepared based on each of the cathode active materials prepared in Examples 1 to 5 and Comparative Examples 1 to 5 and was subjected to charge (at 0.5 C and 4.3V) and discharge (at 1.0 C and 3.0V) 50 times at 45° C. and the lifespan thereof was measured. The results are shown in Tables 1 and 2 below.

TABLE 1

| | One-body active material (primary calcination temperature) | Surface-layer portion | Before secondary calcination | | | After secondary calcination | | | |
|---|---|---|---|---|---|---|---|---|---|
| | | | Resistance (Ohm) | Residual lithium (%) | Lifespan (%) | Secondary calcination temperature | Resistance (Ohm) | Residual lithium (%) | Lifespan (%) |
| Example 1 | $Li_aNi_{0.75}Co_{0.15}Mn_{0.1}O_2$ (910° C.) | Co/Zr | 52 | 0.120 | 97.6 | 750° C. | 38 | 0.072 | 98.7 |
| Example 2 | $Li_aNi_{0.83}Co_{0.09}Mn_{0.08}O_2$ (910° C.) | Co/Ti | 64 | 0.471 | 95.1 | 750° C. | 36 | 0.154 | 97.5 |
| Example 3 | $Li_aNi_{0.83}Co_{0.09}Mn_{0.08}O_2$ (910° C.) | Co/Al | 64 | 0.471 | 95.1 | 750° C. | 38 | 0.168 | 97.3 |
| Example 4 | $Li_aNi_{0.83}Co_{0.09}Mn_{0.08}O_2$ (910° C.) | Co/P | 64 | 0.471 | 95.1 | 750° C. | 40 | 0.148 | 97.0 |
| Comparative Example 1 | $Li_aNi_{0.83}Co_{0.09}Mn_{0.08}O_2$ (910° C.) | — | 64 | 0.471 | 95.1 | 750° C. | 59 | 0.256 | 95.0 |
| Comparative Example 2 | $Li_aNi_{0.83}Co_{0.17}O_2$ (910° C.) | — | 62 | 0.512 | 88.7 | 750° C. | 55 | 0.215 | 88.5 |
| Comparative Example 3 | $Li_aNi_{0.83}Co_{0.09}Mn_{0.08}O_2$ (910° C.) | Co | 64 | 0.471 | 95.1 | 750° C. | 37 | 0.174 | 96.1 |
| Comparative Example 4 | $Li_aNi_{0.83}Co_{0.09}Mn_{0.08}O_2$ (910° C.) | Co | 64 | 0.471 | 95.1 | 700° C. | 40 | 0.180 | 95.4 |
| Comparative Example 5 | $Li_aNi_{0.83}Co_{0.17}O_2$ (910° C.) | Co | 62 | 0.512 | 88.7 | 750° C. | 35 | 0.189 | 90.4 |
| Example 5 | $Li_aNi_{0.83}Co_{0.17}O_2$ (910° C.) | Co/Ti | 62 | 0.512 | 88.7 | 750° C. | 32 | 0.183 | 92.1 |

TABLE 2

| | One-body active material (primary calcination temperature) | Surface-layer portion | Before secondary calcination | | | After secondary calcination | | | |
|---|---|---|---|---|---|---|---|---|---|
| | | | Charge (mAh/g) | Discharge (mAh/g) | Efficiency (%) | Secondary calcination temperature | Charge (mAh/g) | Discharge (mAh/g) | Efficiency (%) |
| Example 1 | $Li_aNi_{0.75}Co_{0.15}Mn_{0.1}O_2$ (910° C.) | Co/Zr | 223.3 | 195.1 | 87.4 | 750° C. | 221.2 | 198.2 | 89.6 |
| Example 2 | $Li_aNi_{0.83}Co_{0.09}Mn_{0.08}O_2$ (910° C.) | Co/Ti | 229.4 | 199.5 | 87.0 | 750° C. | 228.7 | 203.8 | 89.1 |
| Example 3 | $Li_aNi_{0.83}Co_{0.09}Mn_{0.08}O_2$ (910° C.) | Co/Al | 229.4 | 199.5 | 87.0 | 750° C. | 229.1 | 204.6 | 89.3 |
| Example 4 | $Li_aNi_{0.83}Co_{0.09}Mn_{0.08}O_2$ (910° C.) | Co/P | 229.4 | 199.5 | 87.0 | 750° C. | 228.3 | 203.2 | 89.0 |
| Comparative Example 1 | $Li_aNi_{0.83}Co_{0.09}Mn_{0.08}O_2$ (910° C.) | — | 229.4 | 199.5 | 87.0 | 750° C. | 230.0 | 200.6 | 87.2 |
| Comparative Example 2 | $Li_aNi_{0.83}Co_{0.17}O_2$ (910° C.) | — | 228.9 | 201.9 | 88.2 | 750° C. | 229.3 | 202.9 | 88.5 |
| Comparative Example 3 | $Li_aNi_{0.83}Co_{0.09}Mn_{0.08}O_2$ (910° C.) | Co | 229.4 | 199.5 | 87.0 | 750° C. | 228.8 | 202.7 | 88.6 |
| Comparative Example 4 | $Li_aNi_{0.83}Co_{0.09}Mn_{0.08}O_2$ (910° C.) | Co | 229.4 | 199.5 | 87.0 | 700° C. | 228.9 | 200.3 | 87.5 |
| Comparative Example 5 | $Li_aNi_{0.83}Co_{0.17}O_2$ (910° C.) | Co | 228.9 | 201.9 | 88.2 | 750° C. | 228.2 | 205.2 | 89.9 |
| Example 5 | $Li_aNi_{0.83}Co_{0.17}O_2$ (910° C.) | Co/Ti | 228.9 | 201.9 | 88.2 | 750° C. | 228.0 | 204.3 | 89.6 |

As can be seen from Table 1, as a result of comparing the secondary batteries produced using the cathode active materials prepared in Examples 1 to 5 and Comparative Examples 1 and 2, the secondary batteries produced in Examples exhibited better capacity/efficiency/resistance/lifespan characteristics. In addition, the secondary batteries using the cathode active materials of Examples 3 to 5, as in those of Comparative Examples 3 to 5 containing only Co as control groups, exhibited excellent capacity, resistance, and efficiency due to reduction of Li byproducts by Co in the surface-layer portion and structural recovery by oxygen recombination in the surface layer structure, and were superior to Comparative Examples 3 to 5, particularly exhibited better lifespan characteristics due to the improved structural stability owing to the structure-stabilizing element.

Experimental Example 4—XRD Pattern Analysis

The XRD pattern of each of the cathode active materials prepared in Example 2 and Comparative Example 1 was measured under the following measurement conditions, and the results are shown in FIG. 5. The result of analysis showed that each had a layered structure that satisfies the rhombohedral (R-3m) structure, and the cathode active material of Comparative Example 1 had a c/a ratio (c/a axis)

of 4.39. For reference, the cathode active material of Example 5 had a c/a ratio of 4.42.

[XRD Measurement Conditions]

Power source: CuKα (line focus), Wavelength: 1.541836 Å
Operating axis: 2θ/θ, Measurement method: Continuous, Counting unit: cps
Start angle: 10.0°, End angle: 80.0°, Integration Frequency: 1 time
Sampling width: 0.01°, Scan speed: 1.3°/min
Voltage: 40 kV, Current: 40 mA
Divergence slit: 0.2 mm, Divergence type limit slit: 10 mm
Scattering slit: Open, Receiving slit: Open
Offset Angle: 0°
Goniometer Radius: 285 mm, Optical System: Focusing Method
Attachment: ASC-48
Slit: Slit for D/teX Ultra
Detector: D/teX Ultra
Incident Monochrome: CBO
Ni-Kβ Filter: None
Rotational speed: 30 rpm In addition, the result of XRD analysis on the cathode active material of Example 2 under the above conditions before and after secondary calcination showed that the length of the C-axis was changed from 14.1958 Å to 14.1983 Å. This is considered to be due to the fact that Co and the structure-stabilizing element bond to oxygen in the layered structure of the cathode active material to increase the distance between the metals, and is also consistent with the results of surface diffusion of Co and the structure-stabilizing element shown in FIG. 3.

Although preferred embodiments of the present invention have been disclosed for illustrative purposes, those skilled in the art will appreciate that various modifications, additions, and substitutions are possible without departing from the scope and spirit of the invention as disclosed in the accompanying claims.

The invention claimed is:

1. A novel one-body particle for cathode active materials, comprising:
   a core of lithium transition metal oxide comprising Ni; and
   a surface-layer portion formed on at least a part of the core,
   wherein the surface-layer portion comprises both Co and a structure-stabilizing element,
   the core is present as a non-aggregated primary particle,
   the structure-stabilizing element has a bond dissociation energy (BDE) with oxygen (O) greater than a bond dissociation energy (BDE) of Co and oxygen (O), and
   the surface-layer portion has a composition represented by the following Formula 2:

$$Li_fNi_gCo_hMn_iM_jO_k \quad (2)$$

wherein f, g, h, l, j and k satisfy 0.95≤f≤1.1, 0.6≤g≤1.0, h≤0.45, 0≤i≤0.4, 0<j≤0.2, and 0<k≤4, respectively, and
M comprises at least one of Ti, Zr, Al, P, Si, B, W, Mg, and Sn.

2. The novel one-body particle according to claim 1, wherein a content of Ni in the core is 60 mol % or more.

3. The novel one-body particle according to claim 1, wherein the primary particle has an average particle diameter (D50) of 1 μm to 20 μm.

4. The novel one-body particle according to claim 1, wherein the surface-layer portion is formed inside the surface of the core.

5. The novel one-body particle according to claim 4, wherein the surface-layer portion is additionally formed outside the surface of the core.

6. The novel one-body particle according to claim 1, wherein the Co forms a layer structure in the surface-layer portion.

7. The novel one-body particle according to claim 1, wherein the surface-layer portion has a thickness of 10% or less of the average particle diameter of the core.

8. The novel one-body particle according to claim 1, wherein the core has a composition represented by the following Formula 1:

$$Li_aNi_bCo_cMn_dD_eO_x \quad (1)$$

wherein a, b, c, d, e and x satisfy 0.95≤a≤1.1, 0.6≤b≤1, 0≤c≤0.4, 0≤d≤0.4, 0≤e≤0.05, and 0<x≤4, respectively, and
D comprises at least one of Ti, Zr, Al, P, Si, B, W, Mg, and Sn.

9. The novel one-body particle according to claim 1, wherein the surface-layer portion is additionally formed outside the surface of the core and has a composition represented by the following Formula 3:

$$Li_lCo_mM_nO_p \quad (3)$$

wherein l, m, n, and p satisfy 0.9≤l≤1.1, 0.9≤m≤1, 0<n≤0.1, and 0<p≤4, respectively, and
M comprises at least one of Ti, Zr, Al, P, Si, B, W, Mg, and Sn.

10. The novel one-body particle according to claim 1, wherein at least one of the Co and the structure-stabilizing element has a higher content in the surface-layer portion than in the core.

11. The novel one-body particle according to claim 1, wherein a content of at least one of the Co and the structure-stabilizing element is 10% or more higher than a content of the same element present in the core.

12. A lithium secondary battery comprising the novel one-body particle according to claim 1 as a cathode active material.

13. A novel one-body particle for cathode active materials, comprising:
   a core of lithium transition metal oxide comprising Ni; and
   a surface-layer portion formed on at least a part of the core,
   wherein the surface-layer portion comprises both Co and a structure-stabilizing element,
   the core is present as a non-aggregated primary particle,
   the structure-stabilizing element has a bond dissociation energy (BDE) with oxygen (O) greater than a bond dissociation energy (BDE) of Co and oxygen (O), and
   the surface-layer portion is formed inside the surface of the core.

14. A novel one-body particle for cathode active materials, comprising:
   a core of lithium transition metal oxide comprising Ni; and
   a surface-layer portion formed on at least a part of the core,
   wherein the surface-layer portion comprises both Co and a structure-stabilizing element, the core is present as a non-aggregated primary particle, the structure-stabilizing element has a bond dissociation energy (BDE) with oxygen (O) greater than a bond dissociation energy (BDE) of Co and oxygen (O), and the surface-layer portion is formed both inside the surface of the core and outside the surface of the core.

15. A novel one-body particle for cathode active materials, comprising:

a core of lithium transition metal oxide comprising Ni; and a surface-layer portion formed on at least a part of the core, wherein the surface-layer portion comprises both Co and a structure-stabilizing element, the core is present as a non-aggregated primary particle, the structure-stabilizing element has a bond dissociation energy (BDE) with oxygen (O) greater than a bond dissociation energy (BDE) of Co and oxygen (O), and the Co forms a layer structure in the surface-layer portion.

* * * * *